(12) United States Patent
Bohnenkamp

(10) Patent No.: US 6,895,128 B2
(45) Date of Patent: May 17, 2005

(54) METHOD AND COMPUTER SYSTEM FOR PREFETCHING OF IMAGES

(75) Inventor: Sascha Bohnenkamp, Bremen (DE)

(73) Assignee: MeVis Breastcare GmbH & Co. KG, Bremen (DE)

( * ) Notice: Subject to any disclaimer, the term of this patent is extended or adjusted under 35 U.S.C. 154(b) by 573 days.

(21) Appl. No.: 09/870,389

(22) Filed: May 29, 2001

(65) Prior Publication Data

US 2002/0186899 A1 Dec. 12, 2002

(51) Int. Cl.[7] .................................................. G06K 9/60
(52) U.S. Cl. ...................... 382/305; 382/100; 382/305; 382/128; 382/132
(58) Field of Search ........................ 382/100, 128–134, 382/305

(56) References Cited

U.S. PATENT DOCUMENTS

| | | | |
|---|---|---|---|
| 4,807,110 A | 2/1989 | Pomerene et al. | |
| 5,917,929 A | 6/1999 | Marshall et al. | |
| 5,987,345 A | 11/1999 | Engelmann et al. | |
| 6,041,135 A | 3/2000 | Buvtaert et al. | |
| 6,098,064 A | 8/2000 | Pirolli et al. | |
| 6,127,669 A | 10/2000 | Sidiropoulos et al. | |
| 6,151,662 A | 11/2000 | Christie et al. | |
| 6,154,767 A | 11/2000 | Altschuler et al. | |
| 6,154,826 A | 11/2000 | Wulf et al. | |
| 6,574,629 B1 * | 6/2003 | Cooke et al. | 707/10 |
| 2002/0102028 A1 * | 8/2002 | Keller et al. | 382/239 |

FOREIGN PATENT DOCUMENTS

EP      766183 A1 *   4/1997   ........... G06F/17/30

* cited by examiner

Primary Examiner—Andrew W. Johns
Assistant Examiner—Patrick Edwards
(74) Attorney, Agent, or Firm—Martin Fleit; Paul D. Bianco; Fleit Kain Gibbons Gutman Bongini & Bianco P.L.

(57) ABSTRACT

A method and system for prefetching of data, such as, image data of medical images, for example, digital radiographic images, into a cache. The prefetching relies on workflow information. The method and system is particularly advantageous for use in screening programs where a large number of individuals are screened for a disease, such as cancer, in particular, breast cancer.

9 Claims, 8 Drawing Sheets

| Image 1 | Image 2 | Image 3 | ... | Image m |

Fig. 3

METHOD AND COMPUTER SYSTEM FOR PREFETCHING OF IMAGES

CROSS REFERENCES TO RELATED APPLICATIONS

This application is related to the following patent applications, filed on the same day as this application and assigned to the same assignee, MeVis Technology GmbH & Co. KG (1) A method arid computer system for screening of medical cases, Ser. No. 09/870,386; filed May 29. 2001, (2) A method and system for in-service monitoring and training for a radiologic workstation, Ser. No. 09/870,388; filed May 29, 2001, (3) Which are here incorporated by reference to be understood in connection with the present invention.

FIELD OF THE INVENTION

The present invention relates to a method and apparatus for the operation of a cache buffer store in a data processing system, such as a computer system for rendering of medical images. More particularly, the invention relates to a method and apparatus including a procedure for prefetching of images and a corresponding algorithm for replacing least recently used images from the cache.

BACKGROUND AND PRIOR ART

In many data processing systems, there is provided between the working memory of the central processing unit and the main memory a high-speed buffer storage unit that is commonly called a "cache". This unit enables a relatively fast access to a subset of data that were previously transferred from the main storage to the cache, and thus, improves the speed of operation of a data processing system.

U.S. Pat. No. 4,807,110 discloses a prefetching mechanism for a cache and a two-level shadow directory. When an information block is accessed, a parent identifier derived from the block address is stored in a first level of the shadow directory. The address of a subsequently accessed block is stored in the second level of the shadow directory, in a position associated with the first-level position of the respective parent identifier. With each access to an information block, a check is made whether the respective parent identifier is already stored in the first level of the shadow directory. If it is found, then a descendant address from the associated second-level position is used to prefetch an information block to the cache if it is not already resident therein. This mechanism is to reduce the occurrence of cache misses.

U.S. Pat. No. 6,154,767 shows a method and apparatus for using attribute transition probability models for prefetching resources. Idle bandwidth of a client is utilized for the prefetching and resource prefetching by the resource server utilizes idle processing and/or data bus resources of the server.

U.S. Pat. No. 6,151,662 discloses a method of data transaction typing for caching and prefetching. A microprocessor assigns a data transaction type to each instruction. The data transaction type is based upon the encoding of the instruction, and indicates an access mode for memory operations corresponding to the instruction. The access mode may, for example, specify caching and prefetching characteristics for the memory operation. The access mode for each data transaction type is selected to enhance the speed of access by the microprocessor to the data, or to enhance the overall cache and prefetching efficiency of the microprocessor by inhibiting caching and/or prefetching for those memory operations.

From U.S. Pat. No. 6,098,064 a method for prefetching and caching documents according to a probability ranked need list is known. Documents are prefetched and cached on a client computer from servers located on the Internet in accordance with their computed need probability. Those documents with a higher need probability are prefetched and cached before documents with lower need probabilities. The need probability for a document is computed using both a document context factor and a document history factor. The context factor of the need probability of a document is determined by computing the correlation between words in the document and a context of the operating environment. The history factor of the need probability of a document is determined by integrating both how recently the document was used and the frequency of document use.

U.S. Pat. No. 6,154,826 discloses a method for maximizing memory system bandwidth by accessing data in a dynamically determined order. The order in which to access said information is selected based on the location of information stored in the memory. The information is repeatedly accessed from memory and stored in the temporary storage until all streamed information is accessed. The information is stored until required by the data processor. The selection of the order in which to access information maximizes bandwidth and decreases the retrieval time.

Caching is an important technique in all fields of data processing where large amounts of data have to be handled, such as image processing. A particular field of image processing is the rendering, archival, retrieval, processing, transformation, analysis and display of medical images, such as, in the field of digital radiography.

U.S. Pat. No. 6,041,135 shows an interactive off-line processing method for radiographic images. In this off-line image processing method for radiographic images an image is decomposed into detail images and multiple resolution levels and a residual image; detail images are modified up to a preset resolution level and a processed image is reconstructed by means of the modified detail images and the residual image. Interactive processing is performed with different parameter settings.

U.S. Pat. No. 6,127,669 discloses a method for computer aided determination of window and level settings for filmless radiology. Input image data is transformed into an image histogram. This histogram is then segmented into a small number of parts corresponding to structures of interest. Segmentation of the histogram is done by a Viterbi optimal runlength-constrained approximation nonlinear filter.

Window and level settings are calculated to correspond to this segmentation. A readable image of one of the structures of interest is then displayed. In another embodiment, the tool provides a menu of optimal window and level settings corresponding to the different types of information a radiologist may be interested in.

A common disadvantage of prior art workstations for processing and displaying of digital radiographic images is the latency time experiences by the user of the system when a new image is loaded.

This is due to the fact that a single digital radiographic image can be over 50 MB in size. For example, in digital mammography a case to be reviewed by a radiologist is composed of about 4 to 8 different images, each 60 MB in size for certain modalities. A complete case thus is about 500 MB of data.

Even with high-speed processors and memory components such volumes of data result in substantial latency times that are often not acceptable for the users of such workstations. As a consequence, usage of data processing systems for the archiving, transformation, retrieval and transformation of digital radiographic images has been limited so far.

SUMMARY OF THE INVENTION

Objects of the invention

It is therefore an object of the present invention to provide an improved method and apparatus for prefetching in order to reduce latency times experienced by a user, in particular with respect to applications for digital radiographic images.

It is a further object of the invention to provide a method and system having an improved "least recently used algorithm" for freeing a cache memory of image data which is no longer needed.

It is a still further object to provide such a method and system for coupling to a central picture archiving and communication system (PACS).

The invention accomplishes the above and other objects and advantages by providing a method and computer system for the prefetching of data, such as image data, for example medical images from the field of digital radiography. The invention enables maximizing system throughput and minimizing latency times experienced by a user. In brief, this is accomplished by taking a predefined workflow into consideration for the prefetching of the images. A corresponding method and system is disclosed in co-pending US Patent Application entitled A Method And Computer System For Screening Of Medical Cases, Ser. No. 09/870,380; filed May 29, 2001, This is of particular advantage in so-called "screening programs" where a large number of medical cases is reviewed sequentially by one or a group of radiologists. Typically the cases of such screening programs are all structured in the same or in a similar way. For example each case can consist of the same sequence of image formats and views.

BRIEF DESCRIPTION OF THE DRAWINGS

The foregoing and other objects and advantages of the invention will become more apparent from the detailed description of the preferred embodiment of the invention described in detail below with reference to the accompanying drawings in which:

FIG. 3 is an illustration of the structure of an individual medical case;

DETAILED DESCRIPTION OF THE PREFERRED EMBODIMENTS

Figure 1:
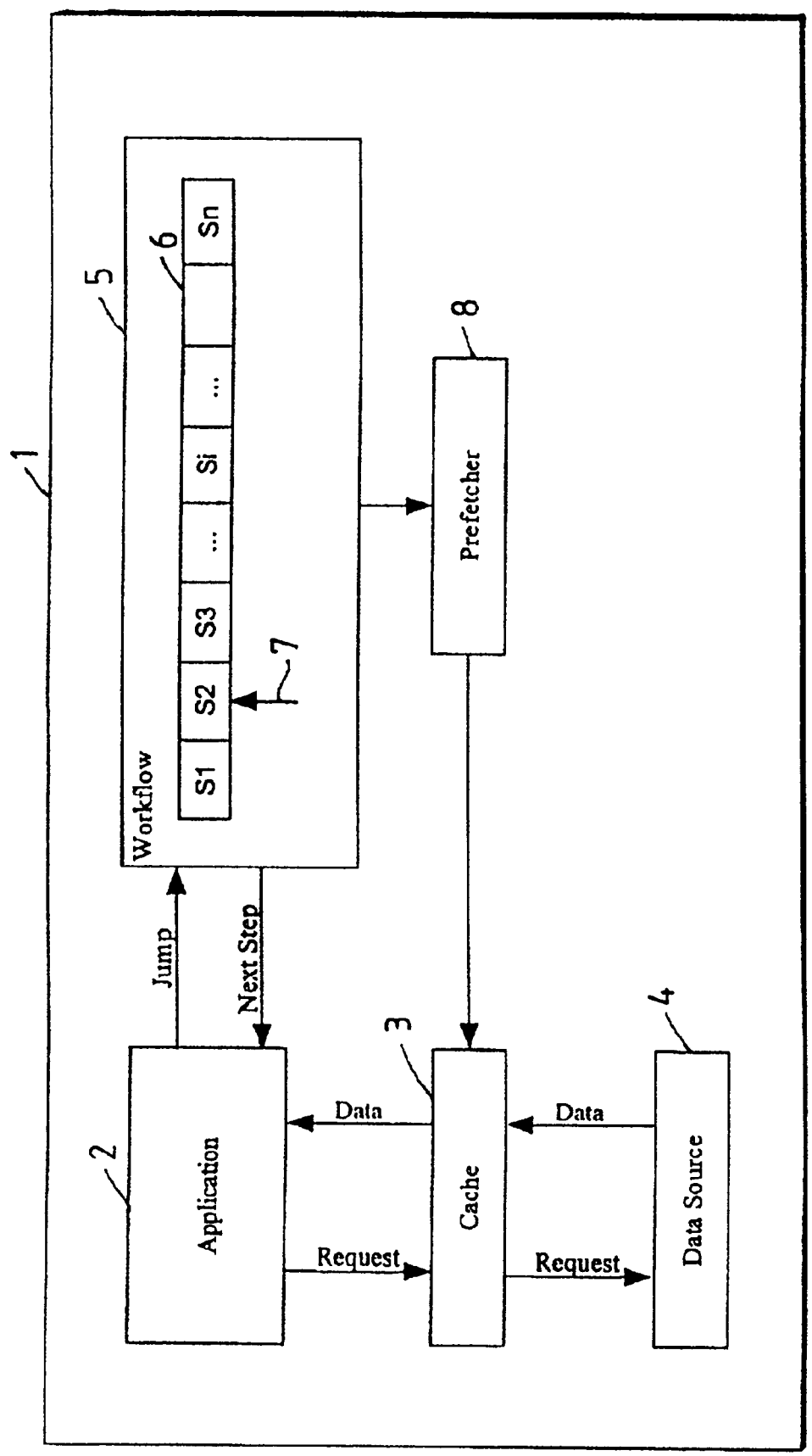
FIG. 1 is a block diagram of a data processing system in accordance with a preferred embodiment of the invention.

The invention will be described in detail as set forth in the preferred embodiments illustrated in the drawings. Although these embodiments depict the invention as in its preferred application, such as, for a digital radiology image system, it should be readily apparent that the invention has equal application to any type of data processing system that encounters or deals with the same or similar problems.

FIG. 1 shows a data processing system 1 having an application program 2 that is coupled to a cache 3.

The cache 3 is coupled to a data source 4. The data source 4 can be any type of data source, such as a file system stored on a hard drive or another storage medium or the output of an image processing device, such as a computer aided diagnosis tool.

The data processing system 1 further has a file 5 for storing a workflow to be performed. The file 5 has a sequence 6 of steps S1, S2, S3, . . . Si, . . . , Sn to be sequentially performed in the workflow. The sequence 6 has a pointer 7 which points to the current step being carried out by the data processing system and/or its user. In the example considered here, the current step to which the pointer 7 is directed, is the step S2.

A prefetcher 8 has access to the file 5 and is coupled to the cache 3 for requesting of data to be prefetched.

In operation, the application program 2 reads the sequence 6 to obtain the step to which the pointer 7 is directed. After the application program 2 has obtained the next step to be carried out, it issues a corresponding request to the cache 3 to request data which are required for the performance of the current step.

These data are transferred from the cache 3 to the application program 2 for display and/or further processing. If a so-called "cache miss" occurs the request for the data is passed to the data source 4 from the cache 3 in order to read the data from the data source 4 and store the data in the cache 3 for access by the application program 2.

A user of the application program 2 can also input a jump request to jump in the sequence 6 in a forward or backward direction. If such a jump occurs, then the pointer 7 is moved by a corresponding number of steps along the sequence 6.

In order to prevent the occurrence of cache misses, the prefetcher 8 reads from the sequence 6 the step consecutive to the current step and all remaining images for the current step. In the example considered here the current step is the step S2 and the consecutive step is the step S3. Hence, when the application program 2 works on the current step S2 the prefetcher 8 reads the consecutive step S3 and performs an access operation to the cache 3 in order to request the data which are required for the application program 2 to perform the step S3.

If the data for carrying out the step S3 is already in the cache 3, no further action is required. If the contrary is the case, the request is transferred to data source 4 in order to provide the cache 3 with the required data.

When the processing of the current step S2 by the application program 2 is complete, the position of the pointer 7 is incremented by one, such that the pointer 7 points to the consecutive step. The consecutive step S3 is read by the application program 2 and the application program 2 requests the data for the performance of the step S3—which is the new current step—from the cache 3.

As the corresponding data has been requested previously from the cache 3 by the prefetcher 8 while the application program 2 was busy with the processing of the step S2, it is ensured that the data for the performance of the step S3 is already loaded in cache 3 such that no cache miss occurs. Again the prefetcher 8 performs an access operation to the sequence 6 in order to read the consecutive step of the new current step S3 in order to request the data being required for the performance of the new consecutive step while the current step S3 is being carried out.

Alternatively the prefetcher 8 can also request the data for a number of consecutive steps or set of steps in the sequence 6 rather than just the data for the next consecutive step.

Figure 2:
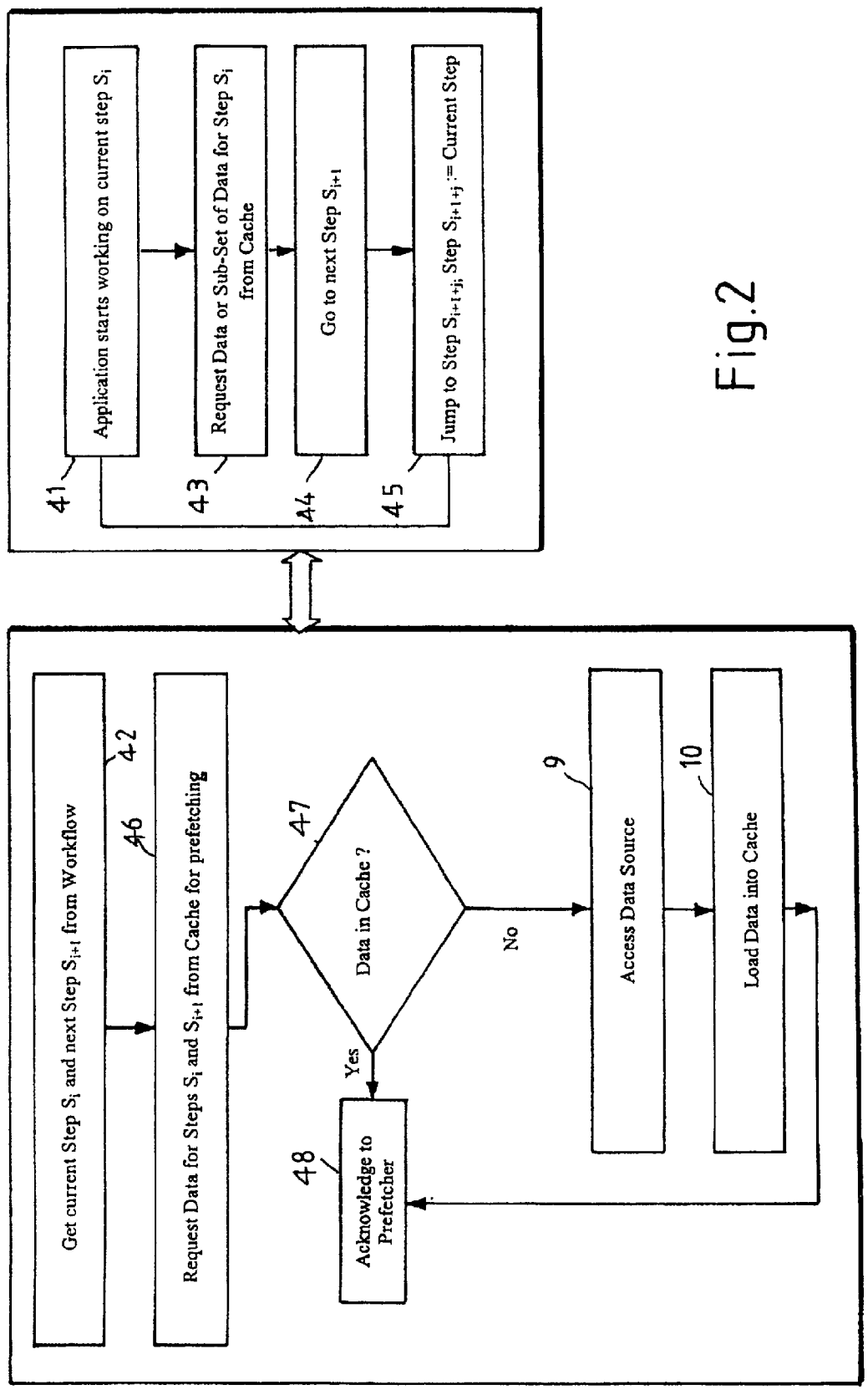
FIG. 2 is a flow chart of the operation of the data processing system of FIG. 1.

FIG. 2 shows a flow chart for illustrating the operation of the data processing system 1 of FIG. 1. In step 41 the application starts working on the current step $S_i$; before or after this the prefetcher obtains the current step $S_i$ and the next consecutive step $S_{i+1}$ from the workflow in step 42.

In step 43 the application requests at least a subset of the data required for the performance of the complete step $S_i$ from the cache. During the processing of the step $S_i$ all of the data required for the performance of step $S_i$ is requested by the application in certain discrete data packages.

After the completion of the processing of the step $S_i$ the application goes to the next step $S_{i+1}$ in the workflow in step 44. From there the application jumps to a step $S_{i+1+j}$ in the workflow in the example considered here in response to a corresponding input operation of a user. The step $S_{i+1+j}$ is the new current step. The jump is performed in step 45.

In parallel, the data required for the performance of the current step $S_i$ and the consecutive step $S_{i+1}$ of the current step are requested in step 46 from the cache for the purposes of prefetching. In step 47 it is decided whether the data is already in the cache.

If this is the case an acknowledgement is sent to the prefetcher in step 48. If the contrary is the case a data source is accessed in step 9 in order to load the data into the cache in step 10. Next an acknowledgement is sent to the prefetcher in step 48. It is to be noted that the step 42 and the steps 46 to 48, 9 and 10 are carried out in parallel to the steps 41 and 43 to 45 with respect to the then current step.

FIG. 3 shows the structure of a medical case consisting of a number m of images, image 1 to image m. It is assumed that the medical case of FIG. 3 is a standardized case having a predefined number, kinds and formats of images. Such a standardization of medical cases is advantageous for large screening programs where a large number of individuals are examined for a disease, such as cancer, especially breast cancer.

Figure 4:
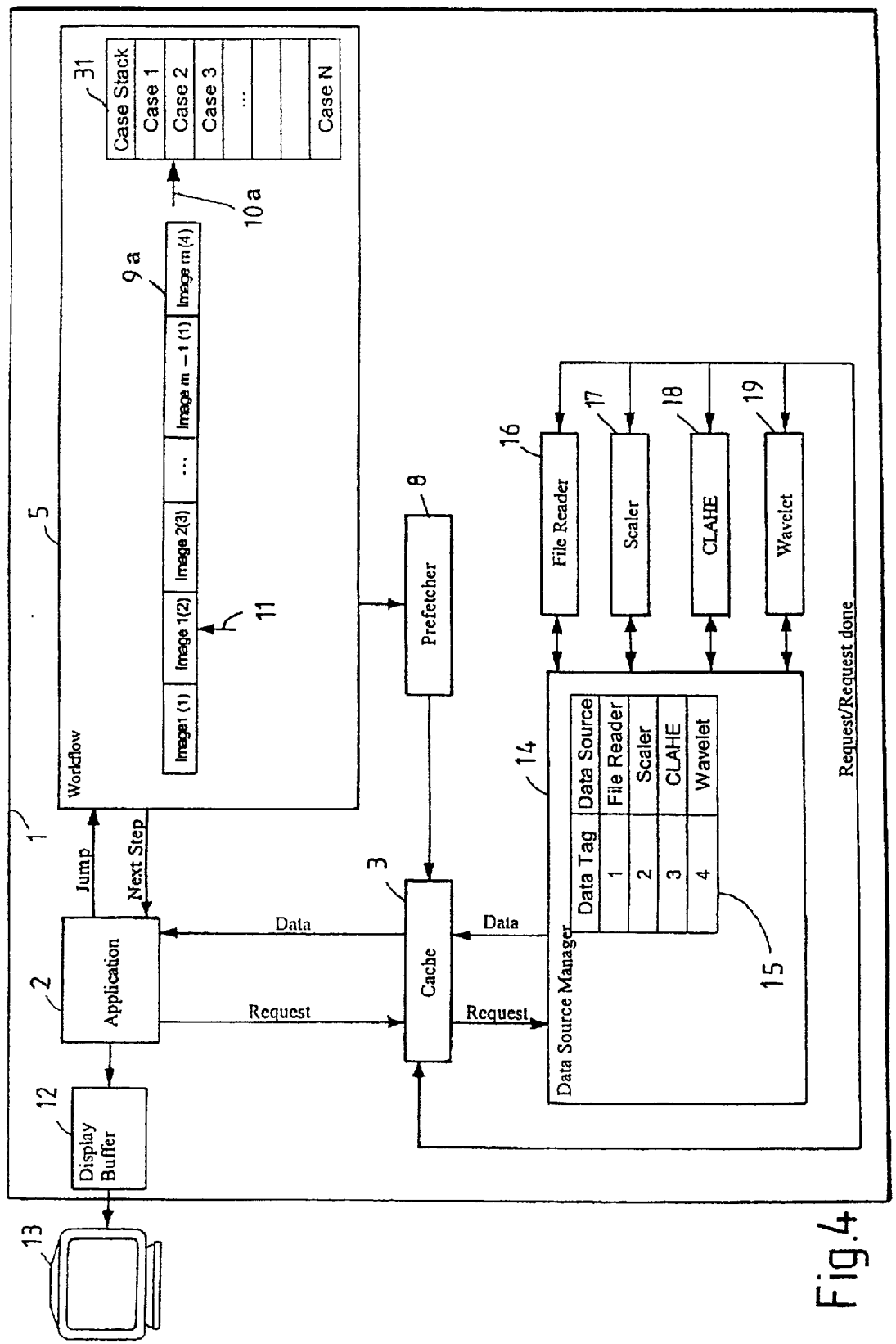
FIG. 4 is a block diagram of a digital radiology image workstation in accordance with a second preferred embodiment of the invention.

FIG. 4 is a further preferred embodiment of a data processing system in which like elements are denoted with the same reference numerals as in FIG. 1. File 5 of FIG. 4, which is descriptive of the workflow, contains a case stack 31. The case stack 31 contains a stack of cases, case 1, case 2, case 3, . . . , case N to be reviewed by a radiologist. File 9a is user definable and contains the sequence of images of interest to the radiologist and the corresponding required format. In the example considered here the radiologist has defined the sequences of images of interest to him in the file 9a as follows:

First, the image 1 from the current case is to be displayed in a format 1;

next, the same image 1 is to be displayed in another format 2;

next, the image 2 is to be displayed in a format 3;

. . .

next, image m-1 is to be displayed in the format 1; and

. . .

as the last image in the sequence of images to be reviewed for an individual medical case image m is to be displayed in a format 4.

It is to be noted that image 3 and/or other images of the m images is skipped completely—depending on the user specific initialization of the file 9a.

The case stack 31 has a pointer 10a which points to the current case being processed by the application 2. In the example considered here this is the case 2. Likewise the file 9a has a pointer 11 pointing to the current image being processed within the current case. In the example considered here the current image is the image 1 (2) of the case 2.

The application 2 is coupled to a display buffer 12 that is coupled to a monitor 13.

Further the cache 3 is coupled to a data source manager 14. The data source manager 14 has a table 15 relating image formats (Data Tags) to corresponding data sources. In the example, the format 1 is related to the data source of file reader 16, the format 2 to the scaler 17, the format 3 to CLAHE 18 for performing of a contrast limited adaptive histogram equalization, and format 4 to wavelet enhancement 19.

In operation, the prefetcher 8 sequentially requests all of the images contained in the current case as indicated by the file 9a from the cache 3, as well as, the images of the consecutive case. For example, when the prefetcher 8 requests the image 1 (1) of the consecutive case 3, the request is provided to the cache 3. If the corresponding data is already in the cache 3 this is acknowledged to the prefetcher 8.

If this is not the case, the request is passed onwards to the data source manager 14. The data source manager 14 identifies the appropriate data source for the request, which is the file reader 16. As a consequence, the image 1 (1) of the case 3 is requested from the file reader 16, which reads the corresponding data from mass storage, such as the hard drive of the data processing system 1, not shown in FIG. 4, and transfers the data to the cache 3.

When the prefetcher 8 requests the image 2 (3) of the case 3, a situation can occur where the image 2 is already in the cache 3, but not in the right format. As the image is not available in the required format the request is still passed onwards to the data source manager 14 for identification of the appropriate data source, which is CLAHE 18 in this case.

As a consequence, the CLAHE 18 is requested to provide the image 2 in the required format 3. This is done by the CLAHE 18 by requesting the corresponding image data in the format 1 from the cache 3, and then performing the contrast limited adaptive histogram equalization on the raw image data. The resulting transformed raw image data is stored in the format 3 in the cache 3 and an acknowledgement is send to the prefetcher 8.

Figure 5:
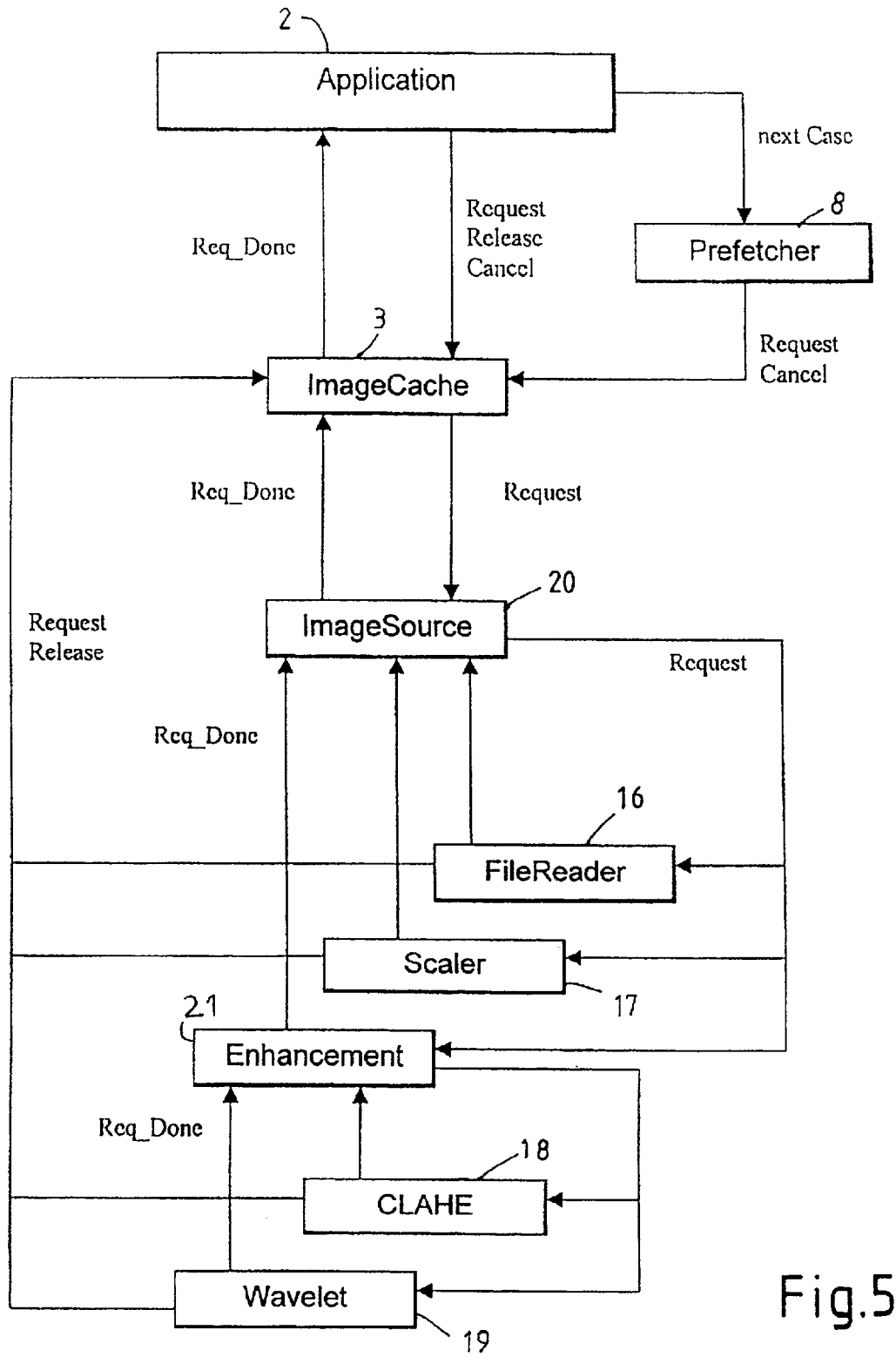
FIG. 5 is a block diagram of a digital radiology image workstation in accordance with a third preferred embodiment of the invention.

FIG. 5 shows a further preferred embodiment of the data processing system. Again the same reference numerals will be used for like elements corresponding to elements of FIGS. 1 and 4.

The application program 2 is coupled to the prefetcher 8 to inform the prefetcher 8 of a next case to be processed. Again the prefetcher requests the images required for the current case and a consecutive case from the image cache 3.

If a requested image is not in the image cache 3, the request is passed onwards to the image source 20. The operation of image source 20 corresponds to the data source manager 14. The image source 20 identifies an appropriate image source such as file reader 16 or scaler 17 or passes the request onwards to enhancement component 21, which passes the request onwards to CLAHE 18 or wavelet transformer 19 depending on the required image enhancement.

The requested image is loaded and/or generated by the respective image source and the image is stored in the image cache 3. This is acknowledged by the data source, which has loaded and/or generated the requested image by the message "Req_done" to all requestors of the image.

If a requestor of the image does not require the image anymore, a "release" message is sent to the image cache 3 from the requestor. Likewise a "cancel" message can be sent to the image cache 3 in case a request is to be cancelled before it has been completed. Such a situation can occur when the user jumps to another case in the case stack.

Figure 6:
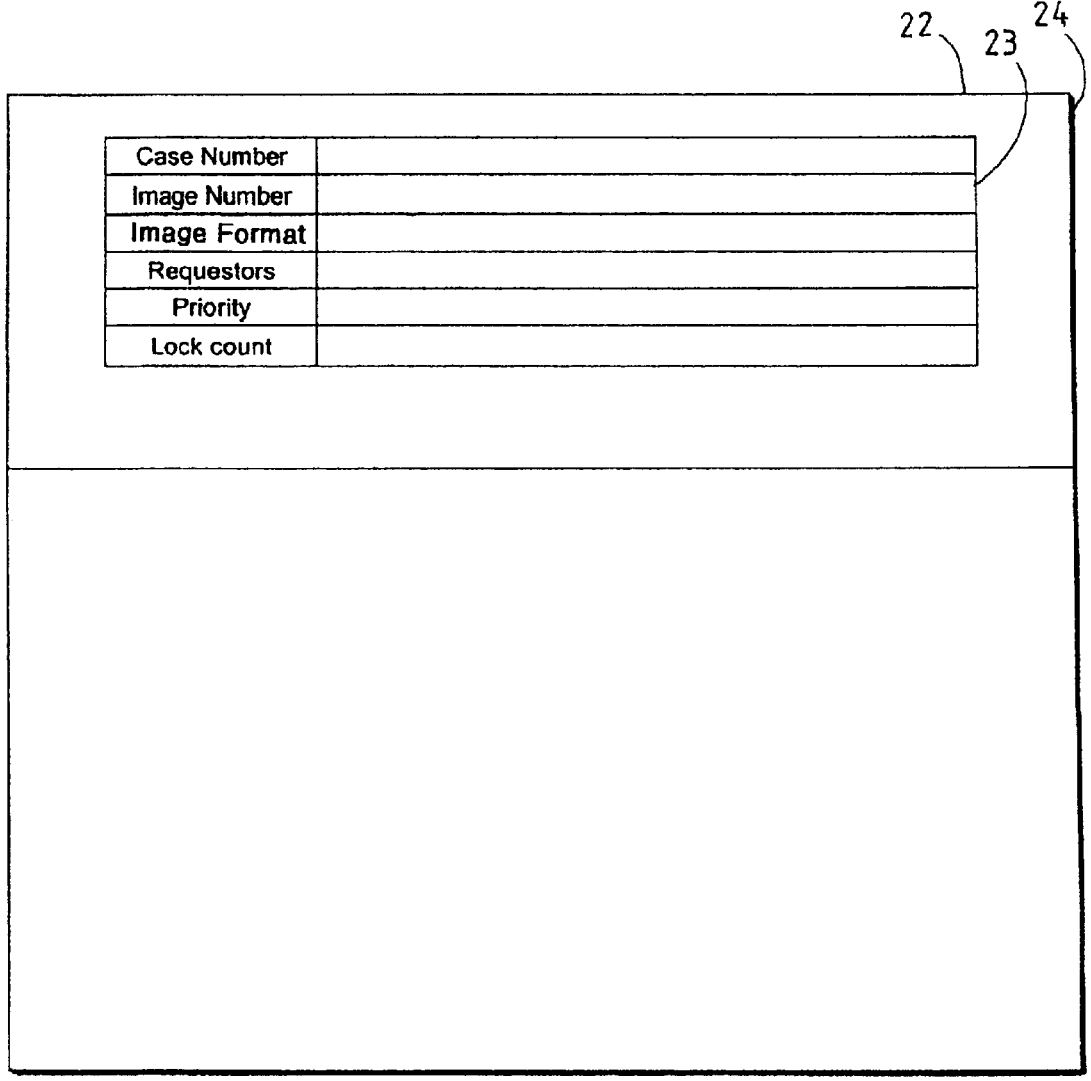
FIG. 6 is an illustration of the header of an image.

FIG. 6. shows the format of an image file 22 having a header 23 and a field 24 for storage of the pictorial data.

The header 23 contains an entry for the case number to which the image belongs, the image number for identification of the image, the image format, the requestors, the priority of the image for the purposes of a least recently used algorithm and a lock count. The utilization of those fields will become more apparent in the following.

Figure 7:
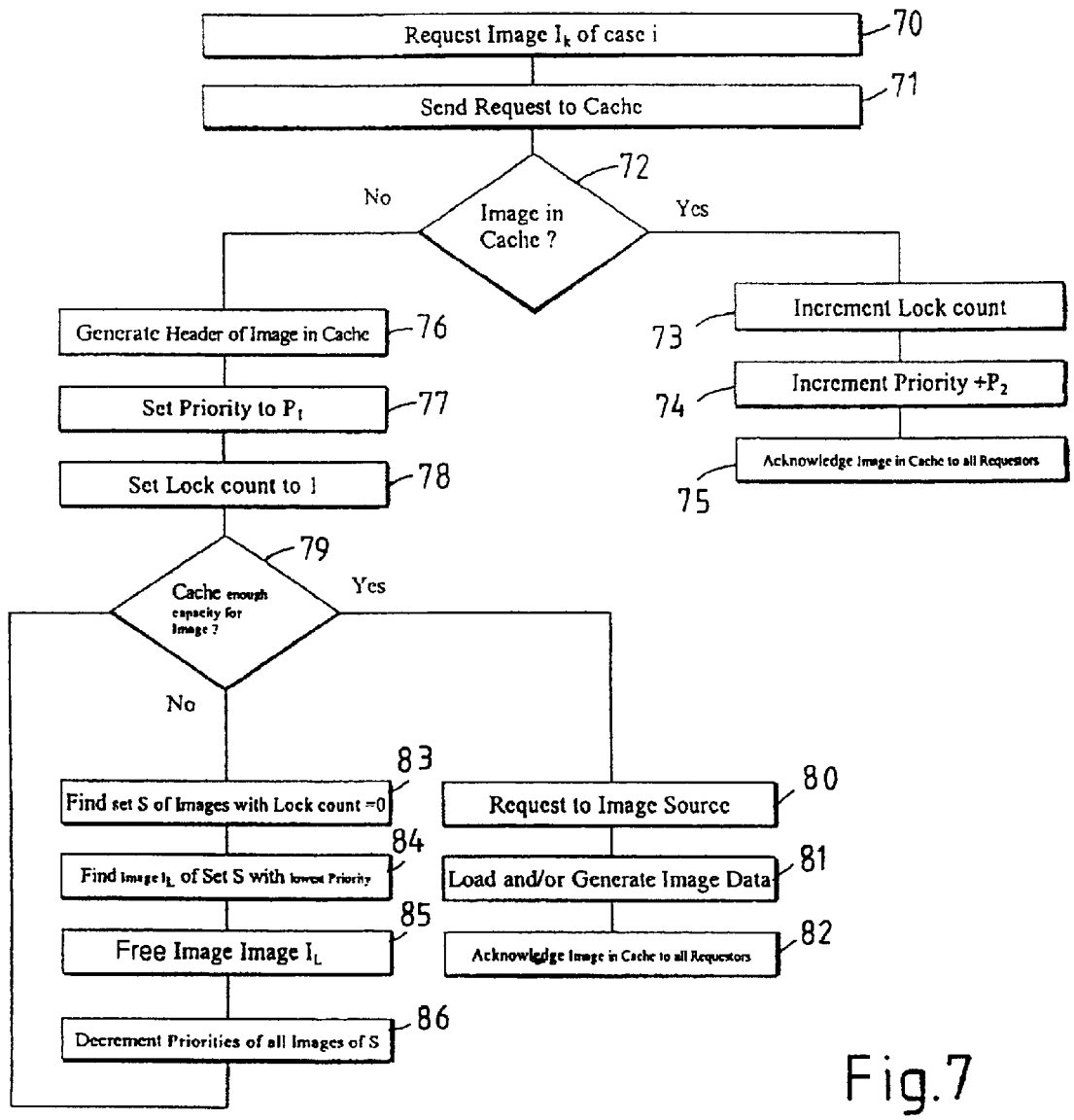
FIG. 7 is a flow chart of the operation of a digital radiology image workstation.

FIG. 7 shows a flow chart for illustrating a least recently used algorithm and the generation of the header 23 of an image. In step 70 an image $I_k$ of a case i is requested by a requester. In principle each of the components of the data processing system can take the role of a requestor of an image. This applies both to the application program as well as to the prefetcher and the data sources.

Also, the application program can have more than one requestor. For example individual program components of the application program can take the role of individual requestors of images.

In step 71 the corresponding request is sent to the cache. In step 72 the cache decides whether the requested image is already available. If this is the case the lock count is incremented in step 73. In step 74 the priority of the image is incremented by $+P_2$. For example, the value of $P_2$ can be equal to 100. In step 75 an acknowledgement is sent to all requestors of the image; the requestors are identified by the corresponding data field in the header 23 of the requested image.

If the image is not in the cache the control goes to step 76 for generation of a header of the image in the cache. The priority of the image is set to be equal to a predefined value of $P_1$ in step 77. For example the value of $P_1$ can be equal to 100. In step 78 the lock count is set to be equal to 1.

In step 79 it is decided whether the cache has enough capacity for loading of the pictorial data of the requested image. If this is the case the pictorial data are requested from the appropriate image source in step 80. In step 81 the pictorial image data are loaded and/or generated by the image source.

This can require that the image source itself issues a request for the image in an appropriate format, for example to calculate the desired transformation in the requested image format. For example, if the image source is CLAHE, the CLAHE requires raw image data in the format 1. Correspondingly, the CLAHE requests the image in the format 1 such that the steps from step 70 onwards are invoked.

Once the requested image is present in the cache in the raw data format 1, the CLAHE image transformation is carried out to generate the image in the requested format 3. This way the step 81 is completed and an acknowledgement is provided to all requestors of the image in the format 3 in step 82.

If it is decided in step 79 that the cache does not have enough capacity, the control goes to step 83. In step 83 the contents of the cache is examined for images having a lock count equal to 0. All images having a lock count equal to 0 are grouped into a set S.

In step 84 an image $I_L$ of the set S having the lowest priority of the images in the set S is identified. This image $I_L$ is freed from the cache in step 85.

In step 86 all priorities of the images of the set S are decremented by one but not below 0. From 86 the control returns back to step 79 in order to repeat the step 83 to 86 if the available cache capacity is still insufficient.

Figure 8:
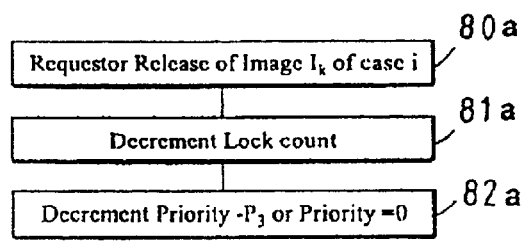
FIG. 8 is a flow chart illustrating the release of an image.

The flow chart of FIG. 8 shows the steps performed when a requestor releases a previously requested image or cancels a request. In step 80a of FIG. 8, the requestor releases the image $I_k$ of case i because the requestor does not require the image anymore.

In step 81a, a corresponding release message is received by the image cache and the header of the image $I_k$ is identified in order to decrement the lock count in the header. This is done in step 81a. In step 82a, the priority is decremented by $P_3$ but not below 0. For example, the value of $P_3$ can be equal to 50. This way the released image can be replaced or removed from the cache in case capacity needs to be provided. The replacement is done in accordance with the least recently used algorithm as illustrated with respect to FIG. 7, in particular steps 83 to 84.

Figure 9:
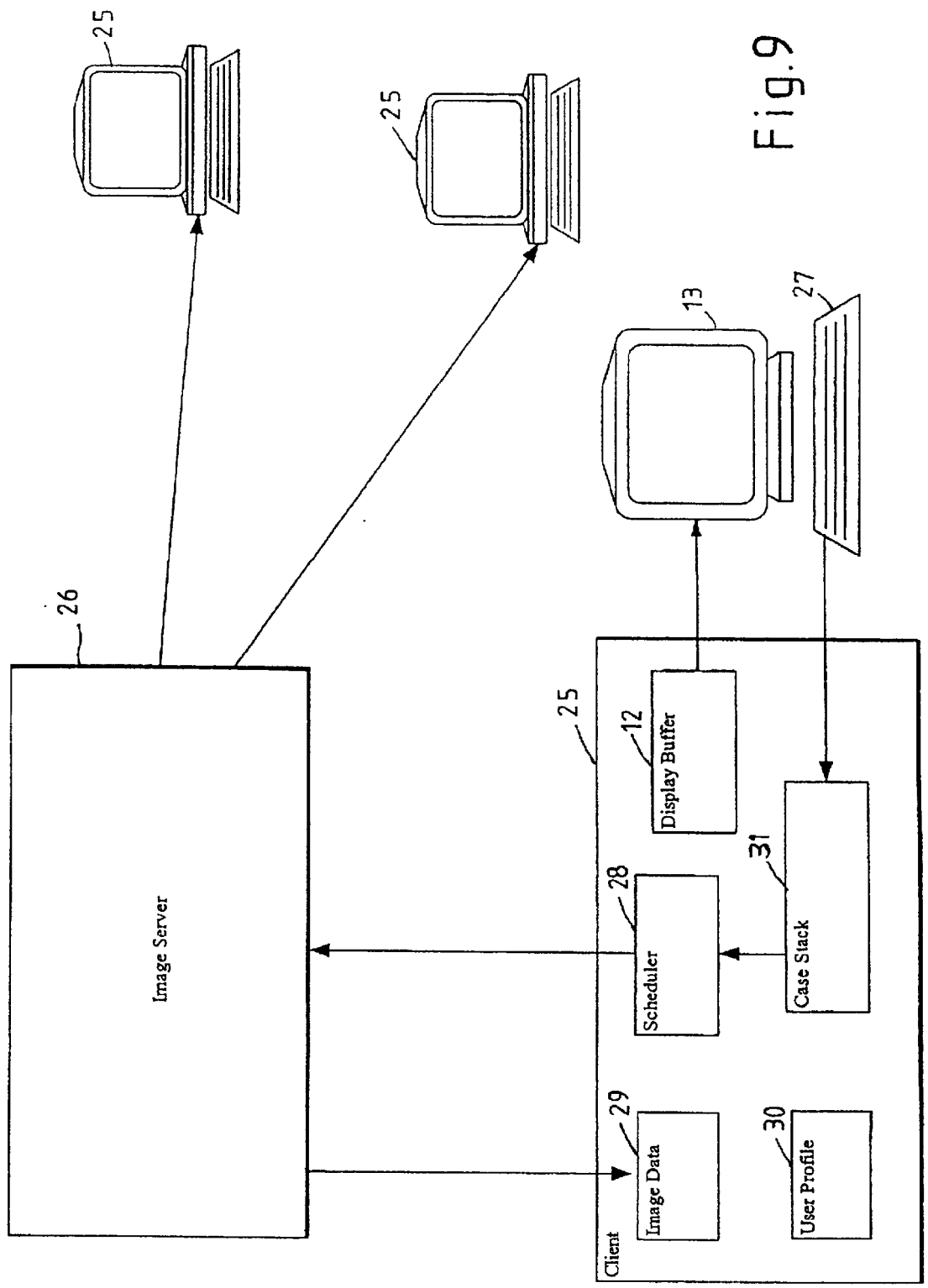
FIG. 9 is a block diagram of a number of digital radiology image workstations connected to the same central image server.

FIG. 9 shows a system having a number of radiographic workstations 25 corresponding to the data processing system 1 of FIG. 1, 4 and 5. The workstations 25 are coupled to an image server 26. The image server 26 has a central archive for medical images.

Each of the workstations 25 has the components of the data processing system 1 of FIG. 4. In addition each workstation 25 has a scheduler 28 that is connected to the case stack 31 and a keyboard 27 for entering jump commands and other entries. Further the workstation 25 has a local storage 29 for the storage of image data provided by the image server 26 and a user profile 30.

In operation the scheduler 28 identifies the case to be processed from case stack 31 and requests the corresponding image data from the image server 26. Preferably this is done when the workstation is not in use by the radiologist such as during night time.

This way the required data can be downloaded from the image server 26 over night, which takes a considerable amount of time in view of the large data volume. The image data is captured and stored on the storage 29 locally on the workstation 25. When the cases of the case stack 31 are reviewed by the radiologist, the required image data is obtained directly from the storage 29 and not from the image server 26 which further reduces latency times.

Although the present invention has been shown and described with respect to preferred embodiments, nevertheless, changes and modifications will be evident to those skilled in the art from the teachings of the invention. Such changes and modifications that embody the spirit, scope and teachings of the invention are deemed to fall within the purview of the invention as set forth in the appended claims.

List of reference numerals

| | |
|---|---|
| data processing system | 1 |
| application program | 2 |

-continued

List of reference numerals

| | |
|---|---|
| cache | 3 |
| data source | 4 |
| file | 5 |
| sequence | 6 |
| pointer | 7 |
| prefetcher | 8 |
| file | 9a |
| pointer | 10a |
| pointer | 11 |
| display buffer | 12 |
| monitor | 13 |
| data source manager | 14 |
| table | 15 |
| file reader | 16 |
| scaler | 17 |
| CLAHE | 18 |
| wavelet transformer | 19 |
| image source | 20 |
| enhancement component | 21 |
| image file | 22 |
| header | 23 |
| pictorial data | 24 |
| workstation | 25 |
| image server | 26 |
| keyboard | 27 |
| scheduler | 28 |
| storage | 29 |
| user profile | 30 |
| case stack | 31 |

What is claimed is:

1. A method for reviewing a large number of medical cases in a screening program, by one or more radiologists, wherein each medical case contains data in the form of a plurality of medical images, each to be viewed in at least one preselected format in the field of digital radiology comprising the steps of:

a) storing in a memory the data relating to each of a large number of medical cases, each case including of a plurality at medical images;

b) processing the medical cases consecutively, at a file in a workflow sequence wherein the same preselected images for each case are consecutively processed and viewed in a preselected sequence of image formats, and providing an output thereof while maintaining a first pointer positioned to indicate the step in the workflow sequence ongoing including incrementing the first pointer to the next successive step of the sequence as the workflow progresses;

c) displaying the output of the workflow so that it can be reviewed and monitored by a radiologist;

d) maintaining a case stack of the medical cases to be processed and maintaining a second pointer indicative of the medical case undergoing processing in the workflow;

e) caching in a cache a current preselected medical image in the appropriate format to be currently processed by the workflow;

f) instructing and controlling by an application program each step of the sequence of steps being performed in the workflow in the file and the cache to call up to the workflow in the file the current preselected medical image of the current medical case of the data to be processed;

g) determining from the position of the first pointer the next consecutive step to be carried out in the sequence, h) responsive to the determination of the first pointer position, checking the cache to determine if the medical image required for the next consecutive step in the sequence is present in the cache in the correct format, and if not, instructing the cache to prefetch the medical image in the correct format and to send it to the cache from a data manager, coupled to the memory and the cache via a plurality of data sources that provide reading, scaling and enhancement formats;

i) manually inputting a jump instruction to the file to select at random a step in the sequence to be performed including incrementing the pointer to the jumped to step;

j) responsive to the instruction to the cache regarding prefetching the medical image for the next consecutive step in the sequence, determining in the data manager using data tags indicative of formats one of a plurality of data sources that will effect the correct format;

k) responsive to the determination using data tags, obtaining from memory and putting the data of the medical image in the determined format in the data manager, and sending the formatted data of the medical image to the cache;

l) generating a header for each preselected medical image of a medical case that goes into the cache that includes the case number, the image identification image format, requestors, priority of the image and a lock count;

m) determining upon receipt of a request whether a medical image is in the cache, and if so, incrementing the lock count, incrementing the priority, and informing the requestors;

n) if a requested medical image is not in the cache, generating the header and setting the lock count 1 and setting the priority to a preselected number above 0;

o) checking the cache to determine if it has enough apace to load a requested medical image in the necessary format;

p) if so, requesting the medical image from the data manager and memory in the correct format, loading the medical image into the cache, and acknowledging medical image in cache to requestors;

q) if not, examining the cache to determine all images in the cache with a lock count of 0, and grouping them into a set S, and then examining set S to determine the image with the lowest priority and freeing the determined image with the lowest priority from the cache and decrementing the priorities of all remaining images of set S but not below a lowest value; r) repeating step q until the cache has capacity for the requested medical image and loading the requested image into the cache; and s) releasing an image from the cache upon request and decrementing the lock count of the image and the priority of the image.

2. A method according to claim 1 including the further step of user defining the preselected images.

3. A method according to claim 1 wherein step k) is carried out by an image processing operation being selected from the group consisting of file reading, scaling, CLAHE and wavelet enhancement.

4. Apparatus for reviewing a large number of medical cases in a screening program, by one or more radiologists, wherein each medical case contains data in the form of a plurality of medical images, each to be viewed in at least one preselected format in the field of digital radiology comprising the steps of:

a) a memory for storing in the data relating to each of a large number of medical cases, each case including of a plurality of medical images;

b) a processor for processing the medical cases consecutively, at a file in a workflow sequence wherein the same preselected images for each case are consecutively processed and viewed in a preselected sequence of image formats, and providing an output thereof;

c) a first pointer positioned to indicate the step in the workflow sequence ongoing including incrementing the first pointer to the next successive step of the sequence as the workflow progresses;

d) a display for displaying the output of the workflow so that it can be reviewed and monitored by a radiologist;

e) a case stack for maintaining of the medical cases to be processed, f) a second pointer indicative of the medical case undergoing processing in the workflow;

g) a cache for caching a current preselected medical image in the appropriate format to be currently processed by the workflow;

h) an application program for instructing and controlling each step of the sequence of steps being performed in the workflow in the file and the cache to call up to the workflow in the file the current preselected medical image of the current medical case of the data to be processed;

i) means for determining from the position of the first pointer the next consecutive step to be carried out in the sequence;

j) means for checking the cache to determine if the medical image required for the next consecutive step in the sequence is present in the cache in the correct format, responsive to the determination of the first pointer position, and if not, instructing the cache to prefetch the medical image in the correct format and to send it to the cache from a data manager, coupled to the memory and the cache via a plurality of data sources that provide reading, scaling end enhancement formats;

k) means for manually inputting a jump instruction to the file to select at random a step in the sequence to be performed including incrementing the pointer to the jumped to step;

l) means for determining in the data manager, using data tags indicative of formats, one of a plurality of data sources that will effect the correct format, responsive to the instruction to the cache regarding prefetching the medical image for the next consecutive step in the sequence;

m) means for obtaining from memory and putting the data of the medical image in the determined format in the data manager, responsive to the determination using data tags, and sending the formatted data of the medical image to the cache;

n) means for generating a header for each preselected medical image of a medical case that goes into the cache that includes the case number, the image identification image format, requestors, priority of the image and a lock count;

o) means for determining upon receipt of a request whether a medical image is in the cache, and if so, incrementing the lock count, incrementing the priority, and informing the requestors;

p) means for generating the header and setting the lock count 1 and setting the priority to a preselected number above 0, if a requested medical image is not in the cache;

q) means for checking the cache to determine if it has enough space to load a requested medical image in the necessary format;

r) means for requesting the medical image from the data manager and memory in the correct format, loading the medical image into the cache, and acknowledging medical image in cache to requesters, if the means for checking in step q) determines that there is enough space to load the requested medical image in the cache;

s) means for examining the cache to determine all images in the cache with a lock count of 0, and grouping them into a set S, and then examining set S to determine the image with the lowest priority and freeing the determined image with the lowest priority from the cache and decrementing the priorities of all remaining images of set S but not below a lowest value, if the means for checking in step q) determines that there is not enough space to load the requested medical image in the cache;

t) repeating step q until the cache has capacity for the requested medical image and loading the requested image into the cache; and u) releasing an image from the cache upon request and decrementing the lock count of the image and the priority of the image.

5. Apparatus according to claim 4 further comprising means for a user to define the preselected images of step b).

6. Apparatus according to claim 4 further comprising a scheduler coupled to a remote image server via a communication link, the remote image server containing a database, of images and the scheduler being adapted to initialize a loading operation of images required for carrying out the workflow.

7. Apparatus according to claim 4 further comprising a user profile.

8. Apparatus according to claim 4 wherein the apparatus is contained with in a workstation, and further comprising a plurality of such workstations, each coupled to a remote image server via a communication link, the remote image server containing a database of images, each such workstation containing a scheduler being adapted to initialize a loading operation of images required for carrying Out the workflow in its respective workstation.

9. Apparatus according to claim 4 wherein the means for requesting the medical image from the data manager and memory in the correct format further comprises an image processor for processing a retrieved image into a format selected from the group consisting of file reading, scaling, CLAHE and wavelet enhancement.

* * * * *